United States Patent
Nemeth et al.

(10) Patent No.: US 8,548,033 B2
(45) Date of Patent: Oct. 1, 2013

(54) AUTOMATIC FREQUENCY CONTROL UNDER LOW SIGNAL-TO-NOISE CONDITIONS

(75) Inventors: Jozsef G. Nemeth, Budapest (HU); Peter Szilveszter Kovacs, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 13/331,203

(22) Filed: Dec. 20, 2011

(65) Prior Publication Data

US 2012/0163426 A1    Jun. 28, 2012

Related U.S. Application Data

(60) Provisional application No. 61/426,942, filed on Dec. 23, 2010.

(51) Int. Cl.
   *H04B 1/38*    (2006.01)

(52) U.S. Cl.
   USPC ........... 375/219; 375/254; 375/278; 375/296; 375/346; 375/350

(58) Field of Classification Search
   USPC .............. 375/219, 296, 329, 334, 343, 344, 375/254, 278, 326, 346, 350
   See application file for complete search history.

(56) References Cited

U.S. PATENT DOCUMENTS

| 2004/0004934 | A1 | 1/2004 | Zhu et al. | 370/208 |
|---|---|---|---|---|
| 2007/0036248 | A1* | 2/2007 | Kumura | 375/346 |
| 2007/0140203 | A1* | 6/2007 | Qiao | 370/342 |
| 2008/0285689 | A1* | 11/2008 | Demir | 375/344 |
| 2008/0291893 | A1 | 11/2008 | Yang et al. | 370/350 |
| 2010/0008216 | A1* | 1/2010 | Li et al. | 370/208 |
| 2012/0083304 | A1* | 4/2012 | Yang et al. | 455/507 |

FOREIGN PATENT DOCUMENTS

WO    2009/012790 A2    1/2009

OTHER PUBLICATIONS

International PCT Search Report and Written Opinion, PCT/US2011/066507, 22 pages, Jul. 6, 2012.

* cited by examiner

*Primary Examiner* — Kabir A Timory
(74) *Attorney, Agent, or Firm* — King & Spalding L.L.P.

(57) ABSTRACT

Carrier frequency offset is determined by sample-to-sample phase shifts of a digital radio signal. The CFO range is divided into a number of intervals and creates as many parallel derived streams as there are interval endpoints by pre-compensating ("back rotating") the input by the sample-to-sample phase shift corresponding to the particular endpoint. Magnitude and phase values are computed of the correlation of a preamble pattern period with the preamble segment of each derived stream in parallel. The largest resulting magnitude value(s) are used to zoom in on the actual CFO present in the input stream. Improved accuracy in the presence of noise may be obtained by repeating the search for a shorter interval centered on the prior CFO value. Final CFO and phase values from corresponding correlation computations then determine the actual CFO and corresponding sample-to-sample phase shift to be applied for pre-compensation ("back rotation") in an open-loop AFC.

22 Claims, 6 Drawing Sheets

FIGURE 1

$\Delta \varphi = 2\pi \cdot \Delta f_{TX\text{-}to\text{-}RX} \cdot T$

FIGURE 2

$\Delta \Phi = 2\pi \cdot \Delta f_{TX\text{-}to\text{-}RX} \cdot P \text{ (modulo } 2\pi)$

AUTOMATIC FREQUENCY CONTROL UNDER LOW SIGNAL-TO-NOISE CONDITIONS

RELATED PATENT APPLICATION

This application claims priority to commonly owned U.S. Provisional Patent Application Ser. No. 61/426,942; filed Dec. 23, 2010; entitled "Automatic Frequency Control Under Low Signal-to-Noise Conditions," by József G. Németh and Péter Sz. Kovács; which is hereby incorporated by reference herein for all purposes.

TECHNICAL FIELD

The present disclosure relates to digital communications, and more particularly, to automatic frequency control under low signal-to-noise conditions.

BACKGROUND

The carrier frequencies of the transmitters and receivers (transceivers) used in mobile wireless devices are synthesized from fixed, limited accuracy crystal oscillators. Thus in a pair of communicating wireless devices there may be a difference between the carrier frequencies of the respective transmitter and receiver and the difference, the carrier offset, shows up in the demodulated baseband signal. Although digital techniques can remove the effects of the carrier offset (CFO) by modifying the received signal stream as if it had been demodulated with the recovered transmitter carrier frequency; it is still called Automatic/Adaptive Frequency Control (AFC). The transformation caused by the carrier offset is deterministic but the signal stream also carries noise. Not to become the bottleneck, an AFC digital technique should tolerate noise at least as well as the rest of the baseband processing does.

The time it takes for the AFC to determine the carrier offset ("lock onto the transmitter carrier") lengthens the required transmit frame preamble, thus shortens (through the increase in radio on-time) battery life, hence raises the operating costs of a wireless device. The amount of carrier offset the AFC can compensate determine the required oscillator crystal tolerance, hence influences the purchasing cost of a device.

SUMMARY

Therefore, an efficient method for AFC is desired that lowers the acceptable S/N (Signal-to-Noise Ratio) threshold, relaxes the crystal tolerance requirement, minimizes the acquisition (lock) time and reuses hardware resources otherwise used in symbol decoding thereby significantly reducing the size of any additional hardware required for implementation thereof. Additionally open-loop operation is preferable as it provides for running multiple AFCs in parallel, a necessity when extreme communication conditions are to be satisfied.

According to an embodiment, a method for determining a carrier frequency offset and a corresponding sample-to-sample phase shift present in a sampled digital signal from a radio of a wireless transceiver may comprise the steps of: a) uniformly dividing a carrier frequency offset (CFO) range $[-\Delta\Omega, \Delta\Omega]$ to be compensated, into 'N' intervals of length, such that $\Delta\omega = 2\cdot\Omega/N < \delta/(T\cdot L)$ where $\delta < 1$, T is the sampling period, L is the length of the preamble pattern in samples and the inequality sets the lower bound for the value of N, wherein $\delta$ is the normalized length of the "feasible range" for direct phase calculation; b) selecting midpoint values, $\Delta\omega_0 \Delta\omega_1 \ldots \Delta\omega_{N-2} \Delta\omega_{N-1}$, of the intervals determined in step a); c) connecting a stream of samples of an I-Q format input signal $\ldots s_i s_{i+1} \ldots s_{i+L-1} \ldots$, simultaneously to N "rotate & correlate" units numbered from 0 to N−1 and assigning each midpoint value computed in step b) to the like numbered rotate & correlate unit; d) connecting an A output of the N rotate & correlate units sequentially to the inputs of the "smooth & select" unit; e) starting the rotate & correlate units on an external trigger that indicates a preamble pattern boundary in the input signal stream; f) running a complete rotate & correlate cycle while the rotate & correlate units consume L input samples and compute the correlation vectors $A_i = \alpha \cdot e^{j\Phi_i}$ in polar coordinates $$A_i = \sum_{n=0}^{L-1} p_n^* \cdot s \cdot e^{-j2\pi \cdot \Delta f_i \cdot n \cdot T}$$

where $P = [p_0\ p_1\ \ldots\ p_{L-1}]$ is the sampled preamble pattern of length L, * denotes the complex conjugate and T is the sampling period (sample-to-sample delay); g) at a completion of a rotate & correlate cycle a "smooth & select" unit first filters received magnitudes, along a $\Delta\omega$ axis, in order to diminish effects of large nose spikes in the input signal sample stream, then outputs $\Delta\omega^{max}$, a interval midpoint value to which a largest resulting correlation magnitude value belongs, further comprising outputs indicating success of a cycle; h) saving $\Delta\omega^{max}$ for further processing; i) if the success indication is reject then abandon the computation and signal false preamble lock; j) if the success indication is retry the action to be taken depends on the number of preamble pattern periods still left, wherein at least 2 periods are needed to eliminate random initial phase from the phase calculation, if only 2 periods are left then abandon the computation and signal false preamble lock, otherwise execute the steps starting with step e) on the next L sample segment of the input with the same parameters; k) if the success indication is accept retain $\Delta\omega^{max}$ as $\Delta\omega_{coarse}$ and proceed to step 1; l) finding a refinement by selecting a shortest interval centered on a previously determined $\Delta\omega_{coarse}$ that assures a required accuracy for an end result, dividing it into N intervals, locating interval midpoints and then running steps e) through g) with these as many times as there are preamble pattern periods left, and during the process averaging both the $\Delta\omega^{max}$-s to get its final computed value; m) the averaged $\Delta\omega^{max}$ accumulates a phase shift of $\phi = 2\pi \cdot \Delta\omega^{max} \cdot L \cdot T$ over a preamble pattern period, knowing the slope of the linear phase characteristics the CFO value, $\Delta\omega_{final}$, where the accumulated phase shift would be 0 is determined from $\Delta\omega^{max}$; and n) using $\Delta\phi = 2\pi \cdot \Delta\omega_{final} \cdot T$ for compensation in the AFC.

According to another embodiment, a method for determining a carrier frequency offset and a corresponding sample-to-sample phase shift present in a sampled digital signal from a radio of a wireless transceiver may comprise the steps of: dividing a carrier frequency offset (CFO) range to be covered into a plurality of intervals; creating from a received signal as many parallel derived streams as there are intervals and pre-compensating ("back rotating") signals received by the sample-to-sample phase shift corresponding to a midpoint of a particular one of the plurality of intervals; computing magnitude and phase resulting from a correlation of an expected preamble pattern period waveform with a preamble segment of each derived stream in parallel; applying if necessary, curve fitting (filtering) to resulting magnitude values in order to minimize noise effects; selecting a largest resulting magnitude value(s) to zoom in on an actual CFO present in an input stream of the signals received; repeating a search for a shorter interval centered on a CFO value located in a first run, if needed, in order to improve accuracy in the presence of noise and provided there is still input preamble left to work on; and determining an actual CFO from the CFO values belonging to the selected interval and the result of the corresponding computed correlation phase.

According to still another embodiment, a method for automatic frequency offset compensation under low signal-to-noise conditions may comprise the steps of: a) detecting a preamble pattern boundary; b) initiating an automatic frequency control (AFC) coarse step once the preamble pattern boundary has been detected; c) determining whether the initiated AFC coarse step is a third AFC coarse step, wherein if the initiated AFC coarse step is not the third AFC coarse step then going to step d), and if the initiated AFC coarse step is the third AFC coarse step then going to step i); d) taking a plurality of signal samples over a plurality of offset interval ranges; e) averaging together the plurality of signal samples for each respective one of the plurality of offset interval ranges; f) determining which one of the plurality of offset interval ranges has the averaged signal sample with a largest magnitude; g) determining whether the largest magnitude is greater than an accept threshold, wherein if the largest magnitude is greater than the accept threshold then going to step j), and if the largest magnitude is not greater than the accept threshold then going to step h); h) determining whether the largest magnitude is greater than a reject threshold, wherein if the largest magnitude is greater than the reject threshold then returning to step a), and if the largest magnitude is not greater than the reject threshold then going to step i); i) rejecting the one of the plurality of offset interval ranges having the largest magnitude that is not greater than the reject threshold; j) selecting a portion of the one of the plurality of offset interval ranges having the largest magnitude; k) determining a first refined carrier offset estimate from the plurality of signal samples within the selected portion of the one of the plurality of offset interval ranges having the largest magnitude; l) determining a second refined carrier offset estimate from the plurality of signal samples within the selected portion of the one of the plurality of offset interval ranges having the largest magnitude; m) determining whether the AFC coarse step was a first or a second AFC coarse step, wherein if the AFC coarse step was the second AFC coarse step than going to step n), and if the AFC coarse step was the first AFC coarse step than going to step o); n) averaging the first and second refined carrier offset estimates to provide an averaged carrier offset estimate then going to step q); o) determining a third refined carrier offset estimate from the plurality of signal samples within the selected portion of the one of the plurality of offset interval ranges having the largest magnitude; p) averaging the first, second and third refined carrier offset estimates to provide an averaged carrier offset estimate then going to step q); and q) compensating a frequency offset from a carrier frequency with the averaged carrier offset estimate.

According to a further embodiment of the method, the plurality of offset interval ranges covers at least plus and minus 120 parts per million of the carrier frequency. According to a further embodiment of the method, the each of the plurality of offset interval ranges comprises at least five of the plurality of signal samples. According to a further embodiment of the method, the portion of the selected one of the plurality of offset interval ranges having the largest magnitude covers at least plus and minus 35 parts per million range of the selected one of the plurality of offset interval ranges representing a coarse carrier frequency offset of the carrier frequency.

According to a further embodiment of the method, the step of compensating the carrier frequency offset is done by adjusting a receiver local oscillator frequency. According to a further embodiment of the method, the step of compensating the carrier frequency offset is done by de-rotating a raw I/Q waveform of received data symbols. According to a further embodiment of the method, the step of determining which one of the plurality of offset interval ranges has the averaged signal sample with the largest magnitude uses sixteen (16) resources.

According to a further embodiment of the method, the sixteen (16) resources comprise sixteen (16) rotations of sixteen (16) possible reference symbols covering at least a 240 part per million frequency range. According to a further embodiment of the method, the step of determining the first refined carrier offset estimate uses eight (8) resources. According to a further embodiment of the method, the step of determining another first refined carrier offset estimate uses signal samples at $\Delta t=+1$ of the plurality of signal samples within the selected portion of the one of the plurality of offset interval ranges having the largest magnitude.

According to a further embodiment of the method, the step of determining the another first refined carrier offset estimate uses an additional eight (8) resources. According to a further embodiment of the method, the step of determining the second refined carrier offset estimate uses eight (8) resources. According to a further embodiment of the method, the step of determining another second refined carrier offset estimate uses signal samples at $\Delta t=+1$ of the plurality of signal samples within the selected portion of the one of the plurality of offset interval ranges having the largest magnitude. According to a further embodiment of the method, the step of determining the another second refined carrier offset estimate uses an additional eight (8) resources. According to a further embodiment of the method, the step of determining the third refined carrier offset estimate uses eight (8) resources. According to a further embodiment of the method, the step of determining another third refined carrier offset estimate uses signal samples at $\Delta t=+1$ of the plurality of signal samples within the selected portion of the one of the plurality of offset interval ranges having the largest magnitude. According to a further embodiment of the method, the step of determining the another third refined carrier offset estimate uses an additional eight (8) resources.

According to yet another embodiment, a method for automatic frequency offset compensation under low signal-to-noise conditions in a zero-intermediate frequency receiver may comprise the steps of: receiving data signals having a preamble; converting the received data signals into in-phase (I) and quadrature phase (Q) data signals at a zero intermediate frequency (IF); sampling the I and Q data signals at the zero IF; converting the sampled I and Q data signals to digital representations thereof with I and Q analog-to-digital converters (ADCs); performing automatic frequency offset compensation of the received data signals, comprising the steps of: a) detecting a preamble pattern boundary; b) initiating an automatic frequency control (AFC) coarse step once the preamble pattern boundary has been detected; c) determining whether the initiated AFC coarse step is a third AFC coarse step, wherein if the initiated AFC coarse step is not the third AFC coarse step then going to step d), and if the initiated AFC coarse step is the third AFC coarse step then going to step h); d) averaging together the digital representations of the sampled I and Q data signals within each respective one of a plurality of offset interval ranges; e) determining which one of the plurality of offset interval ranges has the averaged digital representations of the sampled I and Q data signals with a largest magnitude; f) determining whether the largest magnitude is greater than an accept threshold, wherein if the largest magnitude is greater than the accept threshold then going to step i), and if the largest magnitude is not greater than the accept threshold then going to step g); g) determining whether the largest magnitude is greater than a reject threshold, wherein if the largest magnitude is greater than the reject threshold then returning to step a), and if the largest magnitude is not greater than the reject threshold then going to step h); h) rejecting the one of the plurality of offset interval ranges having the largest magnitude that is not greater than the reject threshold; i) selecting a portion of the one of the plurality of offset interval ranges having the largest magnitude; j) determining a first refined carrier offset estimate from the digital representations of the sampled I and Q data signals within the selected portion of the one of the plurality of offset interval ranges having the largest magnitude; k) determining a second refined carrier offset estimate from the digital representations of the sampled I and Q data signals within the selected portion of the one of the plurality of offset interval ranges having the largest magnitude; l) determining whether the AFC coarse step was a first or a second AFC coarse step, wherein if the AFC coarse step was the second AFC coarse step than going to step m), and if the AFC coarse step was the first AFC coarse step than going to step n); m) averaging the first and second refined carrier offset estimates to provide an averaged carrier offset estimate then going to step p); n) determining a third refined carrier offset estimate from the plurality of signal samples within the selected portion of the one of the plurality of offset interval ranges having the largest magnitude; o) averaging the first, second and third refined carrier offset estimates to provide an averaged carrier offset estimate then going to step p); and p) compensating a frequency offset from a carrier frequency of the received data signals with the averaged carrier offset estimate.

According to a further embodiment of the method, bandpass filtering of the I and Q data signals is done at a zero IF. According to a further embodiment of the method, the step of decoding the digital representations comprises the step of converting the I and Q data signals into data symbols. According to a further embodiment of the method, the data symbols are sent to a serial communications interface. According to a further embodiment of the method, an output of the communications interface is coupled to a digital processor. According to a further embodiment of the method, the digital processor is a microcontroller and memory.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Figure 2:
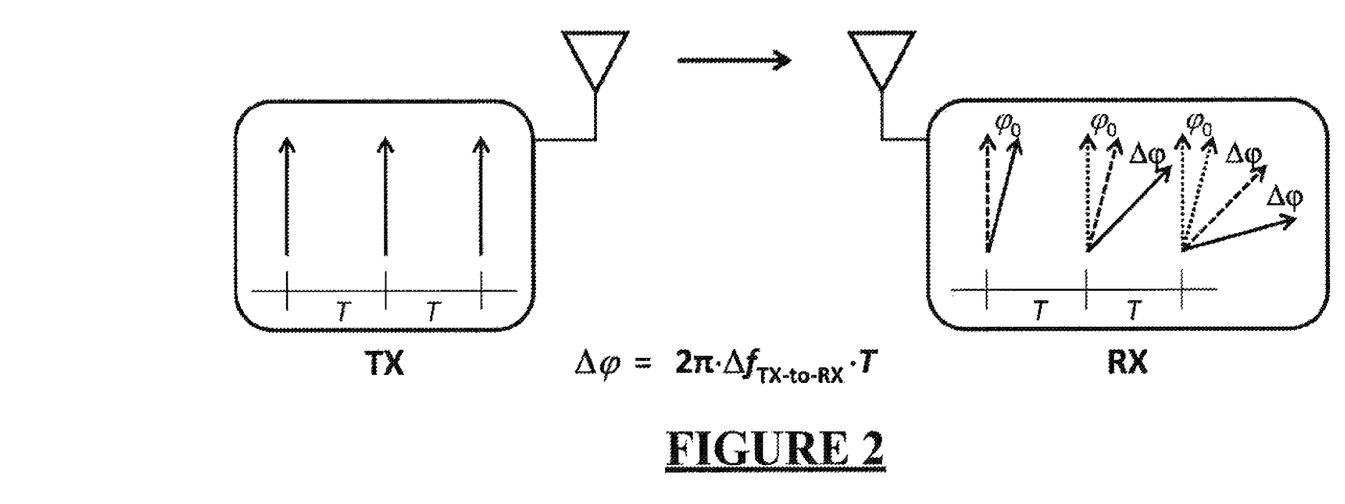
FIG. 2 illustrates a textbook graphical representation of carrier frequency offset (CFO) between a transmitter and receiver that introduces rotation into the received signal vector.

It is a textbook fact that the carrier offset $\Delta f_{TX-to-RX}$ introduces rotation into I-Q demodulation as shown on FIG. 2. (The random initial phase, $\phi_0$, depends on such factors as the propagation delay from transmitter to receiver and the random initial phases of the carriers during modulation/demodulation.)

Accordingly, the steps for an AFC method, according to the teachings of this disclosure, may be as follows:

Estimate $\phi_0$ and $\Delta\phi$ at the beginning of the frame and 'rotate each received symbol backwards' by the accumulated phase ($\phi_0+\Delta\phi$, $\phi_0+2*\Delta\phi$, $\phi_0+3*\Delta\phi$, . . . ) before further processing. Additionally, use a sufficiently long waveform in the computation of $\phi_0$ and $\Delta\phi$ in order to cancel/diminish the effect of noise present in the signal.

With some modulation schemes, as is the case with MSK, determination of $\phi_0$ is not required. Also, the term 'rotate the symbol stream backwards by $\Delta\phi$' is generally used to describe the process.

The method according to the teachings of this disclosure, uses the result of the correlation of the input with a period of the ideal preamble pattern:

Magnitude: A(t)~"resemblance to ideal preamble pattern"
Phase: $\phi(t)=2\pi\cdot\Delta f_{TX-to-RX}\cdot t+\phi_{t=0}$ (modulo $2\pi$)

Figure 3:
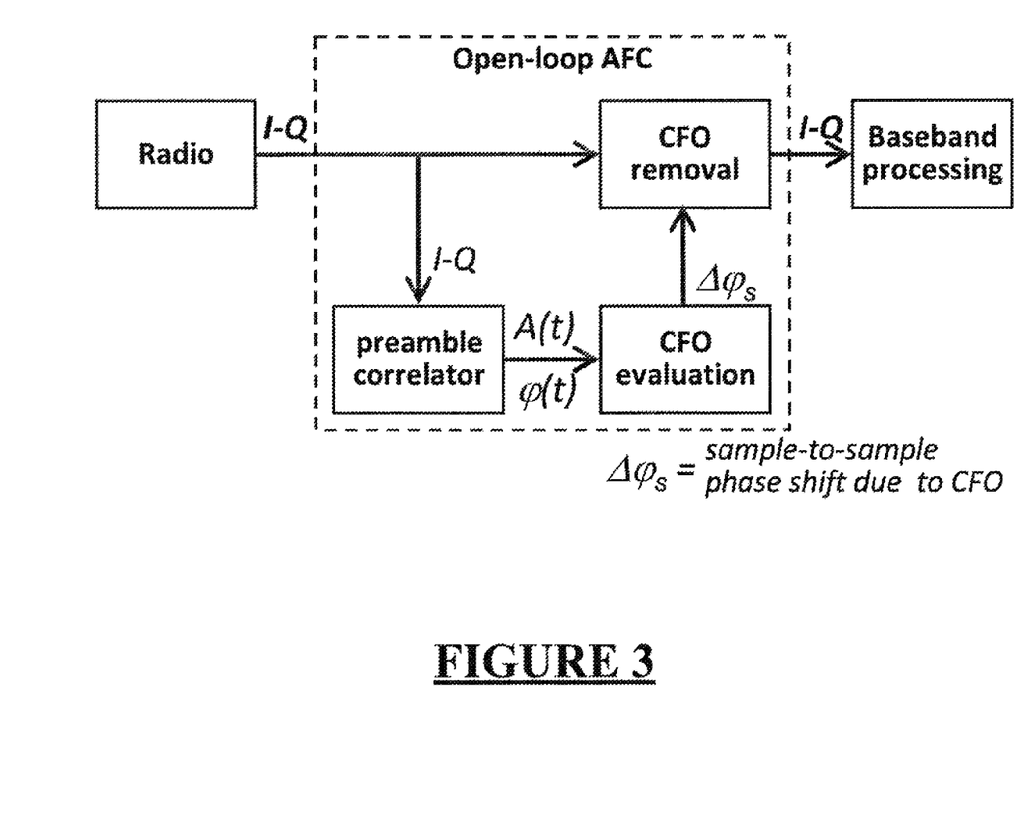
FIG. 3 illustrates a schematic block diagram of a conceptual structure of an AFC module and its placement in a digital portion of a wireless receiver, according to the teachings of this disclosure.

The conceptual structure and the placement of the open-loop AFC module is shown on FIG. 3.

The computation is done with the sampled version of the signals and the results at the preamble pattern boundaries t=P, 2P, . . . are used. In the compensation ("back rotation") the amount of the phase shift due to the CFO between two consecutive samples is used.

Figure 4:
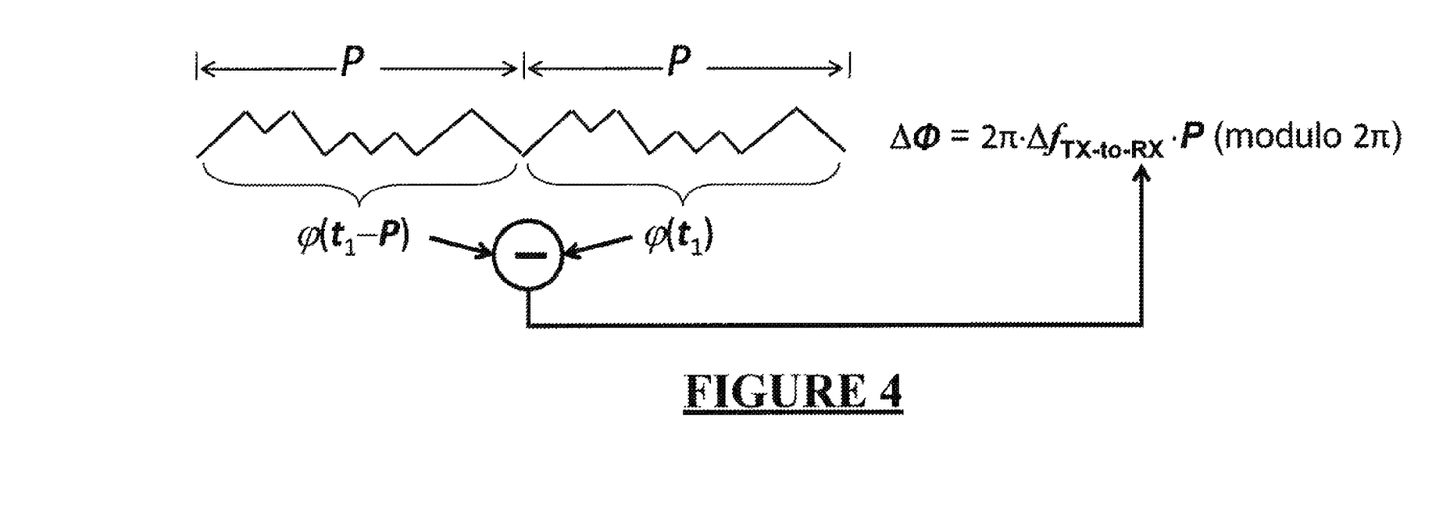
FIG. 4 illustrates a graphical presentation showing that phase measurements over two consecutive preamble pattern periods are needed in order to eliminate the random initial phase present in the received signal, according to the teachings of this disclosure.

Two correlation periods are required to remove the random initial phase (FIG. 4).

However, there is an implicit problem to overcome. Straightforward phase computation produce (mod $2\pi$) results [wrap at $\pm\pi(180°)$] thus integer rotations, if any, are lost. Computations, on the other hand, over short enough time intervals where wrap does not occur are extremely sensitive for noise.

According to the teachings of this disclosure the missed integer rotations can be recovered with the help of the computed magnitude values of the correlation.

Figure 5:
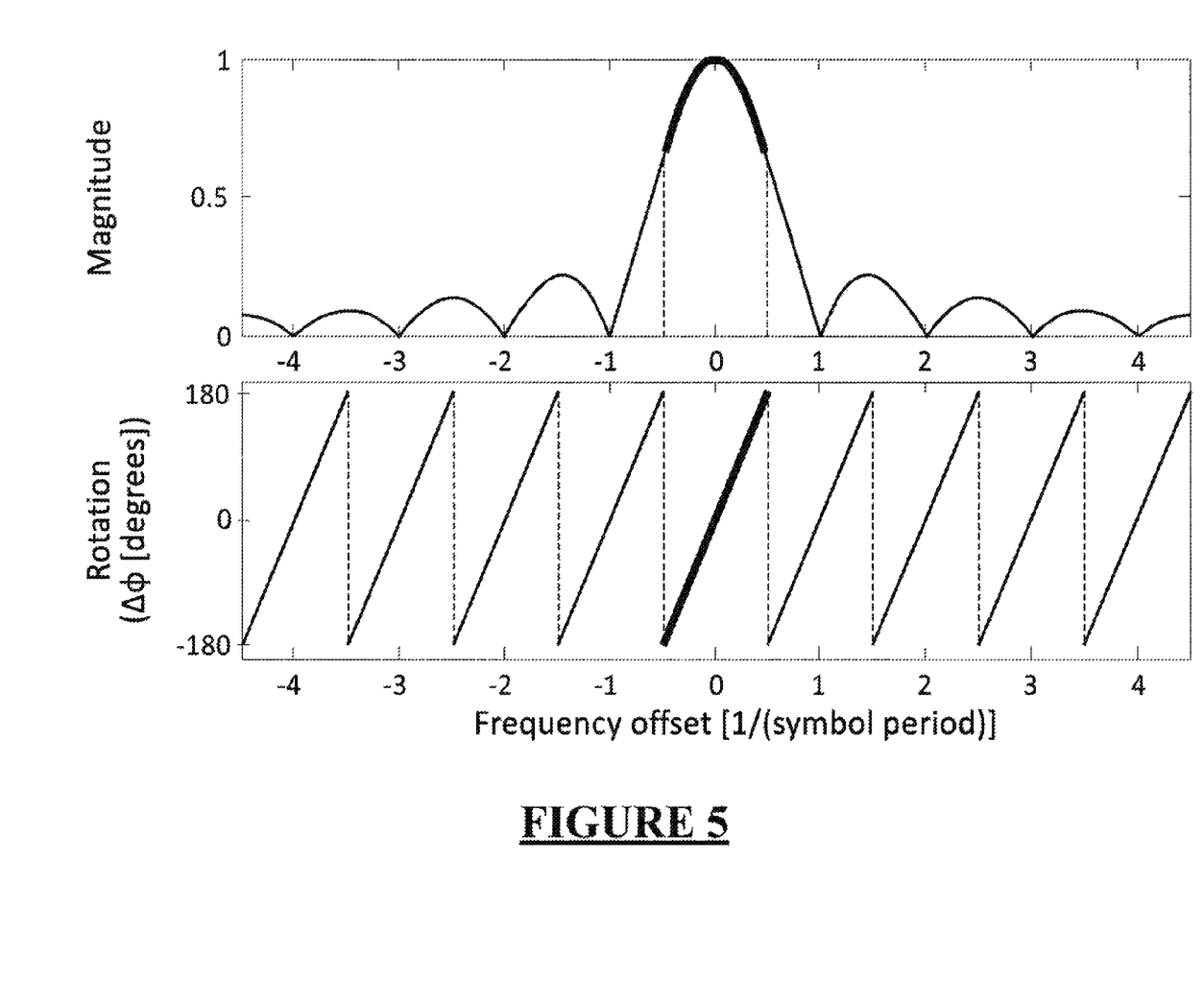
FIG. 5 illustrates graphical representations for the ideal (noiseless & distortion free) case of magnitude values of the preamble correlation result as well as the phase rotation over one correlation period as a function of the carrier offset (normalized to symbol timing), according to the teachings of this disclosure.

FIG. 5 plots the magnitude and phase of a correlation period as a function of the carrier offset (normalized to symbol timing).

As it can be seen, the magnitude of the correlation output has a pronounced peak in the interval (around zero) where the phase calculation produces (with no missed integer rotations) the actual carrier offset. This leads to the following General Method for Computing the CFO.

Determine the full carrier frequency offset range to be covered from the allowed crystal inaccuracy and divide it into intervals, each shorter than the one that results in a full rotation. For each interval midpoint, rotate the input backwards by the corresponding sample-to-sample phase shift and run the correlation for a preamble pattern on the preamble segment of the resulting signals.

The actual CFO value falls in the vicinity of the midpoint with the highest correlation magnitude value.

To improve accuracy in the presence of noise the search can be repeated for a shorter interval centered on the CFO value located in the first run, provided there is still preamble left to work on.

The CFO belonging to the selected interval midpoint implies a total phase shift accumulated over a preamble pattern period. Knowing the slope of the linear phase characteristics the CFO value where the accumulated phase shift would be 0 can be determined.

In practice, all computations must execute in parallel, requiring as many resources as there are intervals.

Figure 6:
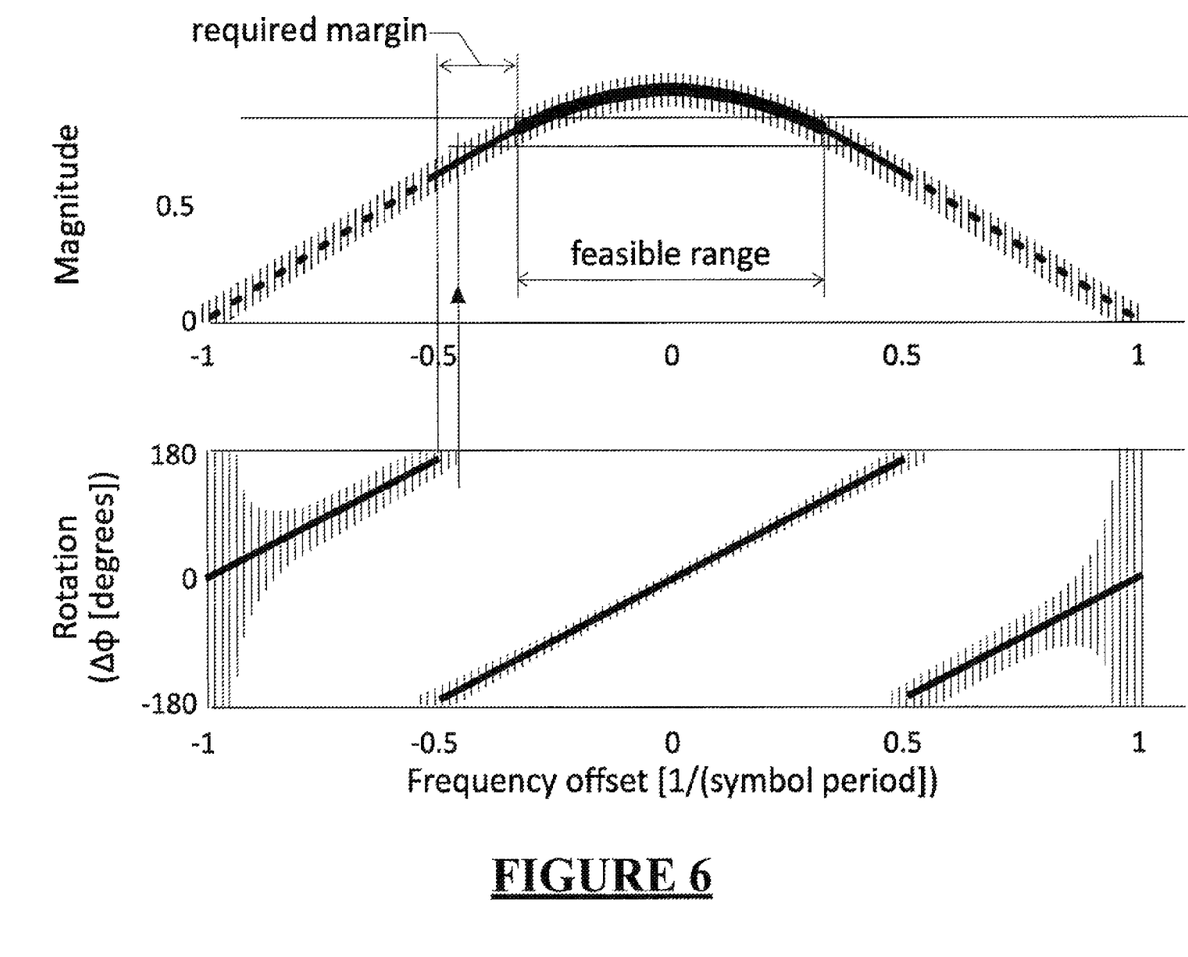
FIG. 6 illustrates graphical representations of the effect of (heavy) noise on the ideal curves and indicates how the feasible CFO range in which no phase wrap occurs is shortened.

In the presence of noise the computed magnitude and phase values deviate from the idealistic curves. As illustrated in FIG. 6, the hatched areas qualitatively show where the samples fall in the case of low S/N.

It also shows that the carrier offset range (around zero) in which the direct phase computation can produce dependable results is considerably shortened. Thus in the skeletal algorithm above the intervals should not be wider than the feasible range computed as shown on the figure. Running simulations with the actual parameters is the practical way to determine (the significant parts of) the contours of the hatched areas.

Refinements are thus necessary for the practical implementation. These are discussed as they are applied in an actual wireless transceiver design.

A specific example embodiment of a general method may be extracted from the open-loop AFC realization for an IEEE 802.15.4 class, 2.4 GHz, 125 kb/s to 2 Mb/s rate, proprietary wireless transceiver.

Design Constraints:

At most 4 preamble pattern periods are available for AFC lock.

The initial segment of the preamble is consumed by the AGC and preamble pattern search. The AFC can be started only after the latter signals the finding of a boundary candidate. The worst case scenario leaves only 4 preamble pattern periods for the AFC.

Even at −4 dB S/N the residual carrier offset after compensation must be less than ±3 ppm.

−4 dB S/N is the sensitivity threshold for payload demodulation at 125 kb/s. In this particular transceiver, however, symbol rate is not known until after the SFD [Start-of-Frame Delimiter] (already requiring AFC lock) is detected. So not to become the performance bottleneck the AFC should still operate at this particularly low S/N level.

16 backwards rotated symbol streams can be handled simultaneously.

There are 16 resources inherently needed for 802.15.4 payload demodulation, used for comparing the incoming waveform with all the 16 possible 'reference symbols'. These are also suitable for the offset computation and can be reused for it as payload demodulation is inactive during AFC.

Only a 70 ppm carrier offset interval may be covered by 16 resources.

This follows from accuracy, reliability and robustness considerations. It is, however, way too short compared to the targeted 240 ppm (+/−60 ppm crystal accuracy) range that simulations show could be achieved if the given resource limit would not be imposed. This leads to a two stage implementation. The first stage uses the 16 resources to compute an approximate carrier offset value; the second stage then refines this within the 70 ppm interval centered on the carrier offset selected in the first stage.

AFC Method:

1) The AFC is started when preamble search finds a (tentative) preamble pattern boundary. It may, however, be interrupted and restarted in case the preamble search identifies a better pattern boundary. Preamble pattern matching (in this particular device) uses the similarity measure obtained by continuously correlating the ideal preamble pattern with the raw signal stream. Thus occasional false lock can happen that later may be overridden.

2) The AFC starts with the coarse step.

At 2.4 GHz with +/−60 ppm crystal accuracy $\Delta f_{TX\text{-}to\text{-}RX}$ varies in the range of +/−288 kHz. In IEEE 802.15 the preamble pattern length P=16 µs thus $\Delta\phi$ varies over +/−=(4+0.608)·$2\pi$, i.e. less than 10 full rotation over the 240 ppm range. Consequently the 16 resources more than suffice.

Figure 7:
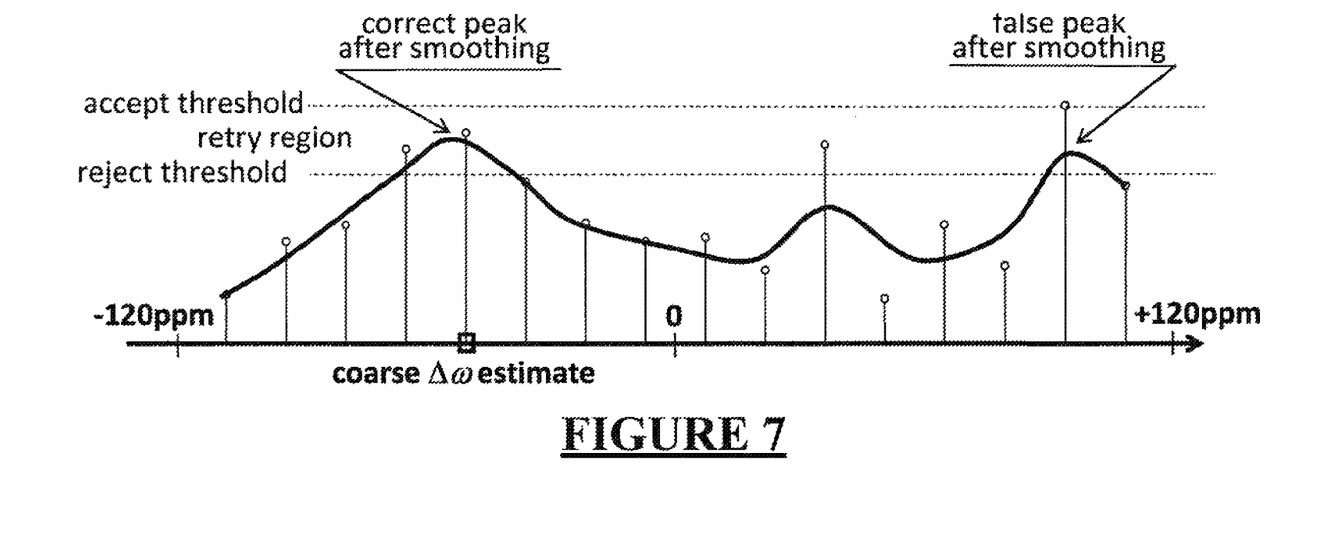
FIG. 7 illustrates a graphical representation of an example output of 16 parallel correlation magnitude computations indicating the smoothing applied to the result and also showing the accept, retry and reject regions used in the evaluation of the result, according to the teachings of this disclosure.

In order to counter the effect of large, narrow noise spikes a 5 sample (2 before/after) filtering is run for each sample (FIG. 7). The largest resulting magnitude value after smoothing designates the coarse $\Delta\omega$ estimate.

However, it is only accepted if its value exceeds the preset accept threshold. At the other end, if the value falls below the reject threshold the AFC is terminated and signals false preamble lock. Values lying in between, in the implicit retry region, restart the AFC by repeating the coarse step. It may happen only once, a second retry attempt would result in reject. (As there are altogether 4 preamble pattern periods available to the AFC and at least 2 of these is required by the refinement step in order to cancel the random initial phase there is no room for a third coarse step!)

Figure 8:
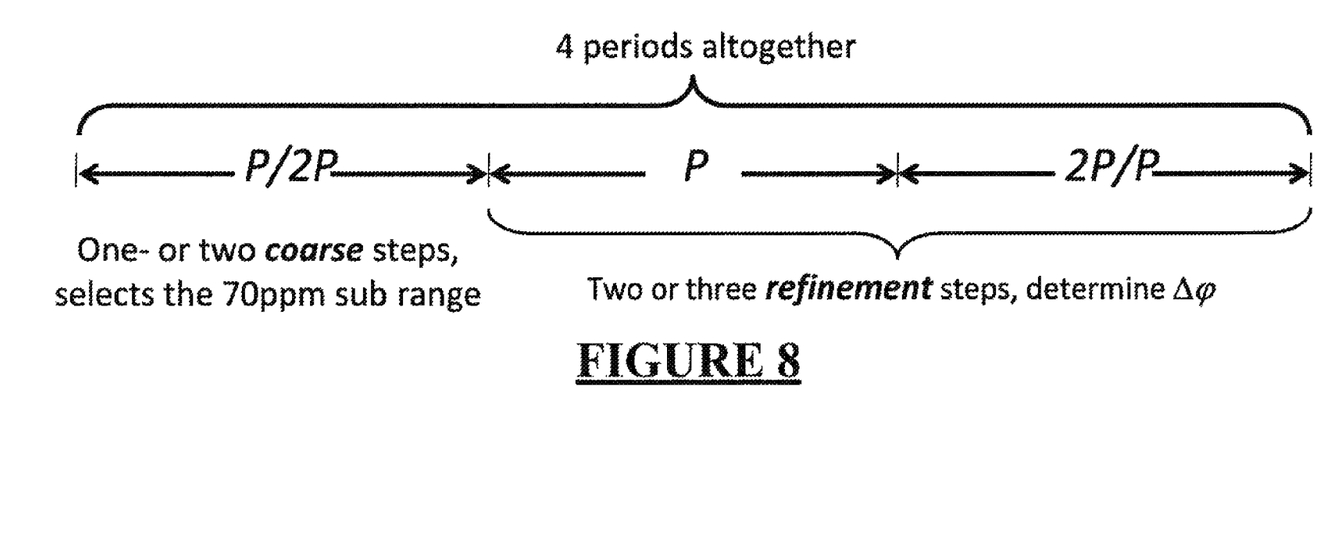
FIG. 8 illustrates a graphical representation of how four preamble pattern periods may be divided between coarse and refinement computational steps, according to a specific example embodiment of this disclosure.

3) The AFC commences with one or two refinement steps. As shown on FIG. 8 the number of steps depends on the number of coarse steps previously applied. If there is a second refinement step then the two results are averaged to get the final $\Delta\omega$ estimate.
4) AFC terminates, compensation turned on, SFD-search started.

Overall performance is summarized in the following table:

| Coarse AFC | Fine AFC | Probability | Effect |
|---|---|---|---|
| ACCEPT on first attempt | 3 periods, averaged result is <3 ppm accurate | ~90% | 0.1% frame error rate |
| ACCEPT after RETRY | 2 periods only, graceful degradation of accuracy | ~10% | 1% frame error rate |
| ACCEPT false peak | REJECT | ~0.1% | frame loss >95% |
| REJECT correct peak | | ~0.1% | frame loss >95% |

All of the aforementioned scenarios thus contribute ~0.1% to the overall frame error rate the total contribution is then ~0.4%. Thus sufficient room is left for other modules within the 1% frame loss margin representative of device performance.

Figure 1:
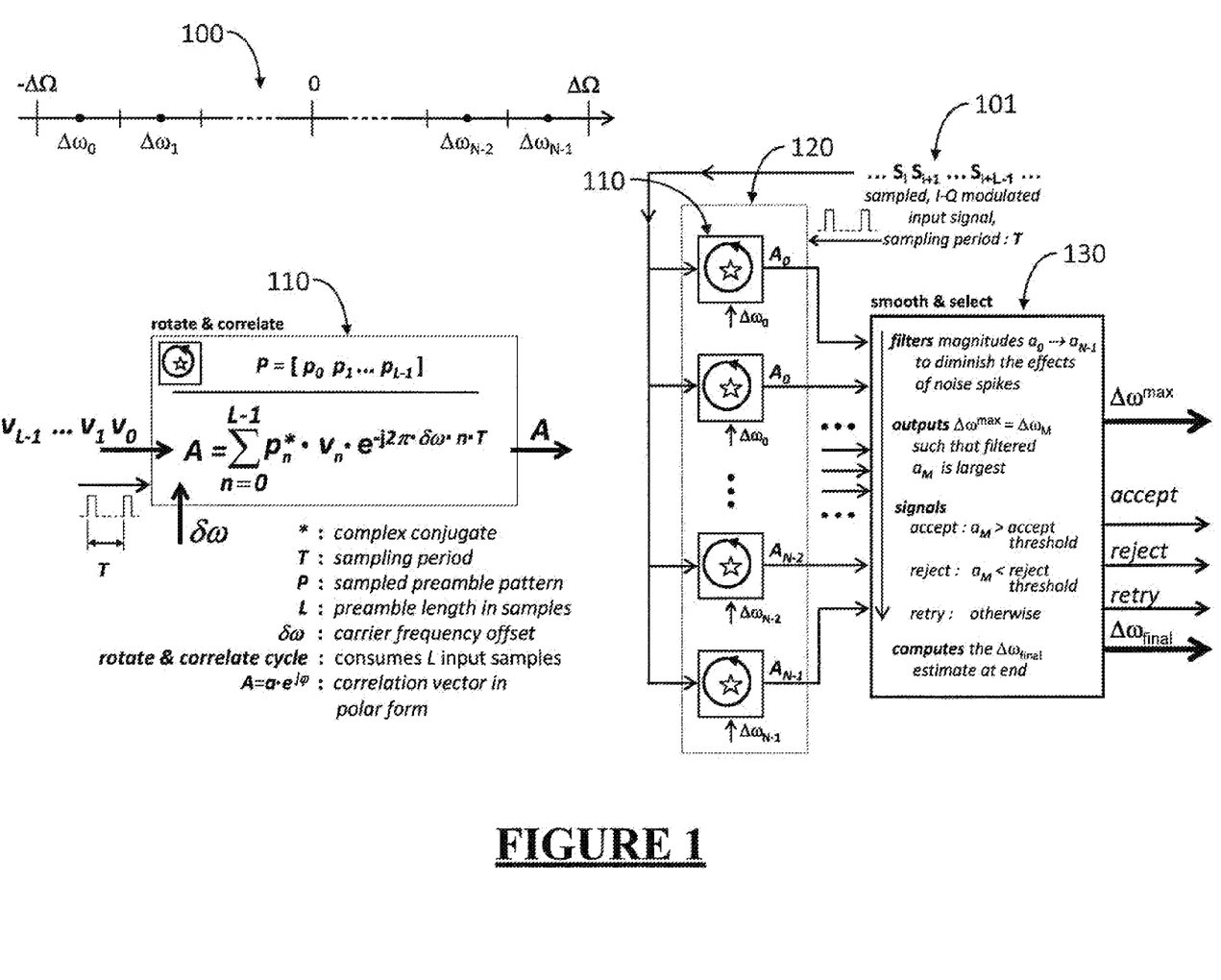
FIG. 1 illustrates a schematic block diagram of an inventive method for automatic frequency control under low signal-to-noise conditions, according to the teachings of this disclosure.

Referring now to FIG. 1 the general method may be formulated as follows a) Uniformly divide the carrier frequency offset (CFO) range $[-\Omega, \Delta\Omega]$ 100 to be compensated, into 'N' equal length intervals of length $\Delta\omega$ such that $\Delta\omega=2\cdot\Delta\Omega/N<\delta/(T\cdot L)$ where $\delta<1$, T is the sampling period, L is the length of the preamble pattern in samples and the inequality sets the lower bound for the value of N. $\delta$ is the normalized length of the "feasible range" for direct phase calculation (Refer to FIG. 6).

b) Select the midpoint values, $\Delta\omega_0 \Delta\omega_1 \ldots \Delta\omega_{N-2} \Delta\omega_{N-1}$, of the intervals determined in step a).

c) Connect the stream of samples of the I-Q format input signal $\ldots s_i s_{i+1} \ldots s_{i+L-1} \ldots$ 101, simultaneously to N "rotate & correlate" units 110, 120 numbered from 0 to N−1, and assign each midpoint value computed in step b) to the like numbered rotate & correlate unit.

d) connect the A output of the N rotate & correlate units sequentially to the inputs of the "smooth & select" 130 unit.

e) Start the rotate & correlate units on an external trigger that indicates a preamble pattern boundary in the input signal stream.

f) Run a complete rotate & correlate cycle, while the rotate & correlate units consume L input samples and compute the correlation vectors $A_i = a_i \cdot e^{j\Phi_i}$ in polar coordinates $$A_i = \sum_{n=0}^{L-1} p_n^* \cdot s \cdot e^{-j2\pi \Delta\omega_i n \cdot T}$$

where $P=[p_0 p_1 \ldots p_{L-1}]$ is the sampled preamble pattern of length L, * denotes the complex conjugate and T is the sampling period (sample-to-sample delay)

g) At the completion of the rotate & correlate cycle the "smooth & select" unit 130 first filters the received magnitudes, along the $\Delta\omega$ axis, in order to diminish the effect of large noise spikes in the input, then outputs $\Delta\omega^{max}$, the interval midpoint value to which the largest resulting correlation magnitude value belongs. It also outputs an indication of the success of the cycle. For a visual indication of the smooth & select operation and the ranges that are used in generating the success indication, refer to FIG. 7 and the example embodiment of the method it belongs to.

h) Save $\Delta\omega^{max}$ for further processing.

i) If the success indication is reject abandon the computation and signal false preamble lock.

j) If the success indication is retry the action to be taken depends on the number of preamble pattern periods still left. As at least 2 periods are needed to eliminate the random initial phase from the phase calculation (refer to FIG. 5) if only 2 periods are left abandon the computation and signal false preamble lock. Otherwise execute the steps starting with step e) on the next L sample segment of the input with the same parameters.

k) If the success indication is accept retain $\Delta\omega^{max}$ as $\Delta\omega_{coarse}$ and proceed to step 1.

l) In order to find a refinement select a shortest interval centered on the previously determined $\Delta\omega_{coarse}$ that assures the required accuracy for the end result. Divide it into N intervals, locate the interval midpoints and run steps e) through g) with these as many times as there are preamble pattern periods left. During the process average the $\Delta\omega^{max}$-s to get its final computed value;

m) The averaged $\Delta\omega^{max}$ accumulates a phase shift of $\phi=2\pi\cdot\Delta\omega^{max}\cdot L\cdot T$ over a preamble pattern period. Knowing the slope of the linear phase characteristics the CFO value, $\Delta\omega_{final}$, where the accumulated phase shift would be 0 is determined from $\Delta\omega^{max}$;

n) Use $\Delta\phi=2\pi\cdot\Delta\omega_{final}\cdot T$ for compensation in the AFC.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for determining a carrier frequency offset and a corresponding sample-to-sample phase shift present in a sampled digital signal from a radio of a wireless transceiver, said method comprising the steps of:

dividing a carrier frequency offset (CFO) range to be covered into a plurality of intervals;

creating from a received signal as many parallel derived streams as there are intervals and pre-compensating ("back rotating") signals received by the sample-to-sample phase shift corresponding to a midpoint of a particular one of the plurality of intervals;

computing magnitude and phase resulting from a correlation of an expected preamble pattern period waveform with a preamble segment of each derived stream in parallel;

selecting a largest resulting magnitude value(s) to zoom in on an actual CFO present in an input stream of the signals received;

repeating a search for a shorter interval centered on a CFO value located in a first run, if needed, in order to improve accuracy in the presence of noise and provided there is still input preamble left to work on; and determining an actual CFO from the CFO values belonging to the selected interval and the result of the corresponding computed correlation phase.

2. A method for determining a carrier frequency offset and a corresponding sample-to-sample phase shift present in a sampled digital signal from a radio of a wireless transceiver, said method comprising the steps of:

dividing a carrier frequency offset (CFO) range to be covered into a plurality of intervals;

creating from a received signal as many parallel derived streams as there are intervals and pre-compensating ("back rotating") signals received by the sample-to-sample phase shift corresponding to a midpoint of a particular one of the plurality of intervals;

computing magnitude and phase resulting from a correlation of an expected preamble pattern period waveform with a preamble segment of each derived stream in parallel;

applying curve fitting (filtering) to resulting magnitude values in order to minimize noise effects;

selecting a largest resulting magnitude value(s) to zoom in on an actual CFO present in an input stream of the signals received;

repeating a search for a shorter interval centered on a CFO value located in a first run, if needed, in order to improve accuracy in the presence of noise and provided there is still input preamble left to work on; and determining an actual CFO from the CFO values belonging to the selected interval and the result of the corresponding computed correlation phase.

3. A method for automatic frequency offset compensation under low signal-to-noise conditions, comprising the steps of:
a) detecting a preamble pattern boundary;
b) initiating an automatic frequency control (AFC) coarse step once the preamble pattern boundary has been detected;
c) determining whether the initiated AFC coarse step is a third AFC coarse step, wherein
  if the initiated AFC coarse step is not the third AFC coarse step then going to step d), and
  if the initiated AFC coarse step is the third AFC coarse step then going to step i);
d) taking a plurality of signal samples over a plurality of offset interval ranges;
e) averaging together the plurality of signal samples for each respective one of the plurality of offset interval ranges;
f) determining which one of the plurality of offset interval ranges has the averaged signal sample with a largest magnitude;
g) determining whether the largest magnitude is greater than an accept threshold, wherein
  if the largest magnitude is greater than the accept threshold then going to step j), and
  if the largest magnitude is not greater than the accept threshold then going to step h);
h) determining whether the largest magnitude is greater than a reject threshold, wherein
  if the largest magnitude is greater than the reject threshold then returning to step a), and
  if the largest magnitude is not greater than the reject threshold then going to step i);
i) rejecting the one of the plurality of offset interval ranges having the largest magnitude that is not greater than the reject threshold;
j) selecting a portion of the one of the plurality of offset interval ranges having the largest magnitude;
k) determining a first refined carrier offset estimate from the plurality of signal samples within the selected portion of the one of the plurality of offset interval ranges having the largest magnitude;
l) determining a second refined carrier offset estimate from the plurality of signal samples within the selected portion of the one of the plurality of offset interval ranges having the largest magnitude;
m) determining whether the AFC coarse step was a first or a second AFC coarse step, wherein
  if the AFC coarse step was the second AFC coarse step than going to step n), and
  if the AFC coarse step was the first AFC coarse step than going to step o);
n) averaging the first and second refined carrier offset estimates to provide an averaged carrier offset estimate then going to step q);
o) determining a third refined carrier offset estimate from the plurality of signal samples within the selected portion of the one of the plurality of offset interval ranges having the largest magnitude;
p) averaging the first, second and third refined carrier offset estimates to provide an averaged carrier offset estimate then going to step q); and
q) compensating a frequency offset from a carrier frequency with the averaged carrier offset estimate.

4. The method according to claim 3, wherein the plurality of offset interval ranges covers at least plus and minus 120 parts per million of the carrier frequency.

5. The method according to claim 3, wherein the each of the plurality of offset interval ranges comprises at least five of the plurality of signal samples.

6. The method according to claim 3, wherein the portion of the selected one of the plurality of offset interval ranges having the largest magnitude covers at least plus and minus 35 parts per million range of the selected one of the plurality of offset interval ranges representing a coarse carrier frequency offset of the carrier frequency.

7. The method according to claim 3, wherein the step of compensating the carrier frequency offset is done by adjusting a receiver local oscillator frequency.

8. The method according to claim 3, wherein the step of compensating the carrier frequency offset is done by de-rotating a raw I/Q waveform of received data symbols.

9. The method according to claim 3, wherein the step of determining which one of the plurality of offset interval ranges has the averaged signal sample with the largest magnitude uses sixteen (16) resources.

10. The method according to claim 9, wherein the sixteen (16) resources comprise sixteen (16) rotations of sixteen (16) possible reference symbols covering at least a 240 part per million frequency range.

11. The method according to claim 3, wherein the step of determining the first refined carrier offset estimate uses eight (8) resources.

12. The method according to claim 11, further comprising the step of determining another first refined carrier offset estimate using signal samples at Δt=+1 of the plurality of signal samples within the selected portion of the one of the plurality of offset interval ranges having the largest magnitude.

13. The method according to claim 12, wherein the step of determining the another first refined carrier offset estimate uses an additional eight (8) resources.

14. The method according to claim 3, wherein the step of determining the second refined carrier offset estimate uses eight (8) resources.

15. The method according to claim 14, further comprising the step of determining another second refined carrier offset estimate using signal samples at Δt=+1 of the plurality of signal samples within the selected portion of the one of the plurality of otTset interval ranges having the largest magnitude.

16. The method according to claim 15, wherein the step of determining the another second refined carrier offset estimate uses an additional eight (8) resources.

17. The method according to claim 3, wherein the step of determining the third refined carrier offset estimate uses eight (8) resources.

18. The method according to claim 17, further comprising the step of determining another third refined carrier offset estimate using signal samples at Δt=+1 of the plurality of signal samples within the selected portion of the one of the plurality of offset interval ranges having the largest magnitude.

19. The method according to claim 18, wherein the step of determining the another third refined carrier offset estimate uses an additional eight (8) resources.

20. A method for automatic frequency offset compensation under low signal-to-noise conditions in a zero-intermediate frequency receiver, said method comprising the steps of:
    receiving data signals having a preamble;
    converting the received data signals into in-phase (I) and quadrature phase (Q) data signals at a zero intermediate frequency (IF);
    sampling the I and Q data signals at the zero IF;
    converting the sampled I and Q data signals to digital representations thereof with I and Q analog-to-digital converters (ADCs);
    performing automatic frequency offset compensation of the received data signals, comprising the steps of:
    a) detecting a preamble pattern boundary;
    b) initiating an automatic frequency control (AFC) coarse step once the preamble pattern boundary has been detected;
    c) determining whether the initiated AFC coarse step is a third AFC coarse step, wherein
    if the initiated AFC coarse step is not the third AFC coarse step then going to step d), and
    if the initiated AFC coarse step is the third AFC coarse step then going to step h);
    d) averaging together the digital representations of the sampled I and Q data signals within each respective one of a plurality of offset interval ranges;
    e) determining which one of the plurality of offset interval ranges has the averaged digital representations of the sampled I and Q data signals with a largest magnitude;
    f) determining whether the largest magnitude is greater than an accept threshold, wherein if the largest magnitude is greater than the accept threshold then going to step i), and
    if the largest magnitude is not greater than the accept threshold then going to step g);
    g) determining whether the largest magnitude is greater than a reject threshold, wherein
    if the largest magnitude is greater than the reject threshold then returning to step a), and
    if the largest magnitude is not greater than the reject threshold then going to step h);
    h) rejecting the one of the plurality of offset interval ranges having the largest magnitude that is not greater than the reject threshold;
    i) selecting a portion of the one of the plurality of offset interval ranges having the largest magnitude;
    j) determining a first refined carrier offset estimate from the digital representations of the sampled I and Q data signals within the selected portion of the one of the plurality of offset interval ranges having the largest magnitude;
    k) determining a second refined carrier offset estimate from the digital representations of the sampled I and Q data signals within the selected portion of the one of the plurality of offset interval ranges having the largest magnitude;
    l) determining whether the AFC coarse step was a first or a second AFC coarse step, wherein
    if the AFC coarse step was the second AFC coarse step than going to step m), and
    if the AFC coarse step was the first AFC coarse step than going to step n);
    m) averaging the first and second refined carrier offset estimates to provide an averaged carrier offset estimate then going to step p);
    n) determining a third refined carrier offset estimate from the plurality of signal samples within the selected portion of the one of the plurality of offset interval ranges having the largest magnitude;
    o) averaging the first, second and third refined carrier offset estimates to provide an averaged carrier offset estimate then going to step p); and
    p) compensating a frequency offset from a carrier frequency of the received data signals with the averaged carrier offset estimate.

21. The method according to claim 20, further comprising the step of bandpass filtering the I and Q data signals at the zero IF.

22. The method according to claim 20, further comprising the step of decoding the digital representations of the I and Q data signals into data symbols.

* * * * *